US011980205B2

United States Patent
Oonishi et al.

(10) Patent No.: US 11,980,205 B2
(45) Date of Patent: May 14, 2024

(54) METHOD FOR PRODUCING CHOCOLATE

(71) Applicant: THE NISSHIN OILLIO GROUP, LTD., Tokyo (JP)

(72) Inventors: Kiyomi Oonishi, Kanagawa (JP); Iwao Hachiya, Kanagawa (JP); Wakako Kanamaru, Kanagawa (JP)

(73) Assignee: THE NISSHIN OILLIO GROUP, LTD., Tokyo (JP)

( * ) Notice: Subject to any disclaimer, the term of this patent is extended or adjusted under 35 U.S.C. 154(b) by 461 days.

(21) Appl. No.: 17/415,737

(22) PCT Filed: Dec. 17, 2019

(86) PCT No.: PCT/JP2019/049364
§ 371 (c)(1),
(2) Date: Jun. 18, 2021

(87) PCT Pub. No.: WO2020/129968
PCT Pub. Date: Jun. 25, 2020

(65) Prior Publication Data
US 2022/0061350 A1    Mar. 3, 2022

(30) Foreign Application Priority Data
Dec. 21, 2018  (JP) ................ 2018-239833

(51) Int. Cl.
*A23G 1/36*  (2006.01)
*A23G 1/00*  (2006.01)
*A23G 1/56*  (2006.01)

(52) U.S. Cl.
CPC ............. *A23G 1/36* (2013.01); *A23G 1/0036* (2013.01); *A23G 1/56* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 5,989,619 A | 11/1999 | Zumbe et al. | |
| 6,165,540 A | 12/2000 | Traitler et al. | |
| 6,488,979 B1 | 12/2002 | Davila et al. | |
| 7,186,435 B2 | 3/2007 | Beckett et al. | |
| 2003/0118697 A1 | 6/2003 | Beckett et al. | |
| 2016/0316780 A1 | 11/2016 | Oonishi et al. | |

FOREIGN PATENT DOCUMENTS

| | | |
|---|---|---|
| JP | H02219543 | 9/1990 |
| JP | H07132047 | 5/1995 |
| JP | 2003284497 | 10/2003 |
| JP | 2012106936 | 6/2012 |
| JP | 2012110268 | 6/2012 |
| WO | 9619923 | 7/1996 |
| WO | 2009081777 | 7/2009 |
| WO | 2009081916 | 7/2009 |
| WO | 2012056673 | 5/2012 |
| WO | 2013191105 | 12/2013 |
| WO | 2015098932 | 7/2015 |
| WO | 2018116908 | 6/2018 |
| WO | 2018185502 | 10/2018 |

OTHER PUBLICATIONS

"International Search Report (Form PCT/ISA/210) of PCT/JP2019/049364," dated Mar. 17, 2020, with English translation thereof, pp. 1-6.
Birgit Schantz et al., "Influence of lecithin—PGPR blends on the rheological properties of chocolate," LWT—Food Science and Technology, vol. 38, Mar. 2004, pp. 41-45.
"Written Opinion of the International Searching Authority (Form PCT/ISA/237) of PCT/ JP2019/049364," dated Mar. 17, 2020, with English translation thereof, pp. 1-15.
Office Action of Indonesia Counterpart Application, with English translation thereof, dated Jan. 16, 2023, pp. 1-6.
"Office Action of Europe Counterpart Application, Application No. 19900338.5", dated Feb. 27, 2023, p. 1-p. 5.
"Search Report of Europe Counterpart Application", dated Jan. 24, 2022, p. 1-p. 16.
"Office Action of China Counterpart Application", issued on Nov. 15, 2023, with English translation thereof, p. 1-p. 13.
"Office Action of Europe Counterpart Application", issued on Feb. 2, 2024, p. 1-p. 5.

*Primary Examiner* — Jyoti Chawla
(74) *Attorney, Agent, or Firm* — JCIPRNET

(57) ABSTRACT

The present invention relates to a method for producing a chocolate dough in a melted liquid state, wherein a polyglycerin-condensed ricinoleic acid ester and a phospholipid, which are contained in the chocolate dough, have at least an intermediate state in which the mass ratio of the content of the polyglycerin-condensed ricinoleic acid ester to the content of the phospholipid is 100:0 to 70:30. The present invention also relates to a method for producing a chocolate dough in a melted liquid state, wherein a polyglycerin-condensed ricinoleic acid ester and a phospholipid are contained in the chocolate dough such that the mass ratio of the content of the polyglycerin-condensed ricinoleic acid ester to the content of the phospholipid is 70:30 to 25:75.

19 Claims, No Drawings

METHOD FOR PRODUCING CHOCOLATE

CROSS-REFERENCE TO RELATED APPLICATION

This application is a 371 application of the international PCT application serial no. PCT/JP2019/049364, filed on Dec. 17, 2019, which claims the priority benefits of Japan application no. 2018-239833, filed on Dec. 21, 2018. The entirety of each of the above-mentioned patent applications is hereby incorporated by reference herein and made a part of this specification.

TECHNICAL FIELD

The present invention relates to a method for producing chocolate dough having a reduced viscosity, a method for producing chocolate using the dough, and particularly, a method for producing heat-resistant chocolate.

BACKGROUND ART

Examples of methods of imparting heat resistance to chocolate include a method of adding oils and fats having a high melting point to chocolate, a method of increasing a solid content of chocolate (reducing an oil and fat content), and a method of mixing chocolate dough with a small amount of water and forming a sugar framework. However, when oils and fats having a high melting point are added, a melting feeling of chocolate significantly deteriorates. When the solid content of chocolate increases, mouthfeel properties of chocolate are impaired. On the other hand, when a sugar framework is formed inside chocolate, heat resistance can be imparted to chocolate without impairing melting feeling and mouthfeel properties. Moreover, even if the environment temperature is equal to or higher than the melting point of oils and fats contained in chocolate, the chocolate can maintain its shape. Therefore, when oils and fats having a low melting point are used, a soft texture can be imparted to chocolate and at the same time, heat resistance can be realized. However, when a small amount of water is mixed into chocolate dough to form a sugar framework, the dough viscosity increases, and thus the productivity of chocolate deteriorates.

In order to minimize the increase in viscosity of the chocolate dough, for example, a method of mixing in glycerol or sorbitol in place of water (for example, U.S. Pat. No. 6,488,979), and a method of mixing in a water-in-oil emulsion (for example, U.S. Pat. No. 6,165,540) are known. However, even if these methods are used, the increase in viscosity is still large, which makes it difficult to industrially produce heat-resistant chocolate.

REFERENCE LIST

Patent Literature

Patent Literature 1: U.S. Pat. No. 6,488,979
Patent Literature 2: U.S. Pat. No. 6,165,540

SUMMARY

Technical Problem

Therefore, it has been desired to develop chocolate dough in which an increase in dough viscosity caused by addition of a small amount of water is minimized.

An objective of the present invention is to provide chocolate dough in which an increase in dough viscosity caused by addition of a small amount of water is minimized and a method for producing the dough.

Solution to Problem

The inventors conducted extensive studies in order to solve the above problems, and as a result, found that the viscosity of chocolate dough is reduced by preparing the chocolate dough through a step in which a proportion of polyglycerin-condensed ricinoleic acid esters and phospholipids contained in the chocolate dough is maintained in a specific range. In addition, it has been found that an increase in viscosity of dough is minimized even if a small amount of water is added to the chocolate dough. Thereby, the present invention has been completed.

Specifically, the present invention may include the following aspects.

[1] A method for producing chocolate dough in a melted liquid state, including passing through at least a state in which a mass ratio between the content of polyglycerin-condensed ricinoleic acid esters and the content of phospholipids contained in chocolate dough is 100:0 to 70:30.

[2] The method for producing chocolate dough in a melted liquid state according to [1], wherein the mass ratio between the content of polyglycerin-condensed ricinoleic acid esters and the content of phospholipids contained in the chocolate dough in a melted liquid state is 70:30 to 25:75.

[3] The method for producing chocolate dough in a melted liquid state according to [1] or [2], wherein the polyglycerin-condensed ricinoleic acid esters are added to the chocolate dough before a first half of a conching process.

[4] The method for producing chocolate dough in a melted liquid state according to any one of [1] to [3], wherein the particle size (D90) is 10 to 30 μm.

[5] A method for producing chocolate, including cooling and solidifying a chocolate dough in a melted liquid state produced by the production method according to any one of [1] to [4].

[6] The method for producing chocolate according to [5], wherein, before the cooling and solidifying, 0.1 to 3 parts by mass of water is added and dispersed in 100 parts by mass of the chocolate dough in a melted liquid state.

[7] A method of reducing the viscosity of chocolate dough in a melted liquid state, including passing through at least a state in which a mass ratio between the content of polyglycerin-condensed ricinoleic acid esters and the content of phospholipids contained in chocolate dough is 100:0 to 70:30.

[8] A method of minimizing an increase in viscosity of chocolate dough in a melted liquid state, including passing through at least a state in which a mass ratio between a content of polyglycerin-condensed ricinoleic acid esters and a content of phospholipids contained in chocolate dough is 100:0 to 70:30, and adding and dispersing water.

[9] A chocolate dough in a melted liquid state which passes through at least a state in which a mass ratio between a content of polyglycerin-condensed ricinoleic acid esters and a content of phospholipids contained in chocolate dough is 100:0 to 70:30, and in which a mass ratio between the content of polyglycerin-condensed ricinoleic acid esters and the content of phospholipids is 70:30 to 25:75.

Advantageous Effects of Invention

According to the present invention, it is possible to provide chocolate dough in which an increase in dough viscosity caused by addition of a small amount of water is minimized and a method for producing the dough.

DESCRIPTION OF THE EMBODIMENTS

Chocolate in the present invention is not limited to those defined by the "Fair Competition Code for labeling chocolates" (National Chocolate Industry Fair Trade Association) and laws and regulations. The chocolate of the present invention may contain edible oils and fats and saccharides as main raw materials, and contain, as necessary, a cacao component (cacao mass, cocoa powder, etc.), dairy products, flavorings, an emulsifier, and the like. The chocolate of the present invention is produced through some or all of chocolate production processes (a mixing process, an atomizing process, a conching process, a cooling process, etc.). In addition, the chocolate of the present invention also includes white chocolate and colored chocolate in addition to dark chocolate and milk chocolate.

The chocolate dough in the present invention is a mixture in which some or all of chocolate raw materials are mixed, and is a mixture of chocolate raw materials at any step before they are cooled and solidified to finally become solid chocolate. The chocolate dough can be, for example, a chocolate raw material mixture after atomizing or a chocolate raw material mixture after conching. The chocolate dough in a melted liquid state in the present invention refers to chocolate dough in which oils and fats contained in chocolate dough are melted. In the case of temper type chocolate dough, whether chocolate dough is in a melted liquid state can be determined by, for example, checking release of chocolate from a mold after the chocolate dough is cooled and solidified. When the cooled and solidified chocolate is not released from the mold (specifically, when the mold release rate of chocolate from the mold is less than 70%), it is determined that chocolate dough is in a melted liquid state.

The chocolate dough of the present invention contains polyglycerin-condensed ricinoleic acid esters (hereinafter referred to as PGPR). The polyglycerin-condensed ricinoleic acid esters may be referred to as a condensed ricinoleate polyglycerin, polyglycerin polylysinolate, polyglycerin-condensed ricinoleic acid ester, or the like. The production method is known, and for example, they are obtained by an esterification reaction between ricinoleic acid obtained mainly from castor oil and polyglycerin. The average degree of polymerization of the condensed ricinoleic acid is preferably about 2 to 10, and more preferably about 2 to 6. In addition, the average degree of polymerization of the polyglycerin is preferably about 3 to 10, and more preferably about 4 to 7. Regarding the polyglycerin-condensed ricinoleic acid esters, commercially available products may be used. Regarding commercially available products, for example, SY GlysterCR-310, CR-500, CR-ED, and CRS-75 (commercially available from Sakamoto Yakuhin kogyo Co., Ltd.), Sunsoft No. 818DG, 818R, and 818SK (commercially available from Taiyo Kagaku Co., Ltd.), and Poem PR-300 (commercially available from Riken Vitamin Co., Ltd.) can be appropriately used. Two or more types of polyglycerin-condensed ricinoleic acid esters may be used in combination. The chocolate dough of the present invention contains preferably 0.05 to 1 mass %, more preferably 0.1 to 0.6 mass %, still more preferably 0.15 to 0.5 mass %, and most preferably 0.18 to 0.4 mass % of polyglycerin-condensed ricinoleic acid esters.

The chocolate dough of the present invention also contains phospholipids. The phospholipids contained in the chocolate dough of the present invention are not particularly limited. However, practically, the phospholipids contained in lecithin can be applied. Lecithin is a mixture of several phospholipids having a surfactant ability, which are widely present in animal and plant species. Lecithin is industrially obtained from oil seeds such as soybean or rapeseed, or obtained from animal raw materials such as egg yolk. For example, soybean lecithin contains phospholipids such as phosphatidylcholine, phosphatidylethaneolamine, phosphatidylinositol, and phosphatidylserine in a mixed state. In addition, as commercially available lecithin, in addition to general crude lecithin, purified powder lecithin obtained by degreasing lecithin, fractionated lecithin obtained by fractionating components of lecithin, enzyme-treated lecithin obtained by reacting lecithin with an enzyme, or hydrogenated lecithin obtained by hydrogenating lecithin can be used. In the chocolate dough of the present invention, generally, crude lecithin having a phospholipid content of about 65 mass % can be suitably used.

The chocolate dough of the present invention contains preferably 0.03 to 1.3 mass %, more preferably 0.06 to 0.8 mass %, still more preferably 0.1 to 0.6 mass %, and most preferably 0.12 to 0.5 mass % of phospholipids. When crude lecithin is applied as phospholipids contained in the chocolate dough of the present invention, the amount of crude lecithin used may be adjusted so that the content of phospholipids is 0.03 to 1.3 mass %. For example, when crude soybean lecithin having a phospholipid content of 65 mass % is used, if the content of crude soybean lecithin contained in the chocolate dough is 1 mass %, the content of phospholipids contained in the chocolate dough is 0.65 mass %. Therefore, when crude lecithin having a phospholipid content of about 65 mass % is generally used, the chocolate dough of the present invention contains preferably 0.05 to 2 mass %, more preferably 0.1 to 1.2 mass %, still more preferably 0.15 to 1 mass %, and most preferably 0.18 to 0.8 mass % of crude lecithin.

Here, the content of phospholipids contained in the crude lecithin can be determined, for example, as the content of acetone insoluble substances. The content of acetone insoluble substances of lecithin is determined, for example, as follows. 2 g of a sample is weighed out into a beaker, 300 ml of ice-cold acetone is added, and the mixture is sufficiently stirred and left for 30 minutes. The supernatant liquid is suction-filtered with a glass filter with a known mass, the insoluble substances are additionally washed three times with 30 ml of ice-cold acetone, and a total amount of insoluble substances is transferred into the glass filter. The glass filter is filled with ice-cold acetone, suction is performed, the glass filter is then dried under a reduced pressure, and the mass is measured. The increase in the mass of the glass filter is a mass of the acetone insoluble substances. (Mass of insoluble substances/amount of sample collected)× 100 is acetone insoluble substances (mass %). In addition, the content of phospholipids may be measured using a colorimetric method according to the standard oil and fat analysis test method of the Japan Oil Chemists' Society (2.4.11-1996)(conversion factor from amount of phosphorus: 25.4).

The polyglycerin-condensed ricinoleic acid esters and phospholipids (for example, crude lecithin) are used as a viscosity reducing agent for chocolate dough in a melted liquid state. It is more effective when the polyglycerin-condensed ricinoleic acid esters and phospholipids are used in combination. When all polyglycerin-condensed ricinoleic acid esters and phospholipids are added to the chocolate dough, a combination of polyglycerin-condensed ricinoleic acid esters and phospholipids preferably at a mass ratio of 70:30 to 25:75, and more preferably at a mass ratio of 65:35 to 30:70 is used. For example, when crude lecithin (phospholipid content of 65 mass %) is used as phospholipids, a combination of polyglycerin-condensed ricinoleic acid esters and crude lecithin preferably at a mass ratio of 60:40 to 15:85 and more preferably at a mass ratio of 55:45 to 20:80 is used.

For example, according to a conventional method, the chocolate dough of the present invention can be prepared as chocolate dough in a melted liquid state through processes such as mixing of raw materials, atomizing by roll refining, and as necessary, a conching treatment. According to refiner conching or the like, refining and conching may be continuously performed by one device, and a conching treatment may be omitted with only wet grinding with a ball mill or the like. The chocolate dough of the present invention is brought into at least a state in which the mass ratio between the content of the polyglycerin-condensed ricinoleic acid esters and the content of the phospholipids contained in the chocolate dough is 100:0 to 70:30 (preferably, 100:0 to 80:20) somewhere in the procedure in which chocolate dough in a melted liquid state in which all of the polyglycerin-condensed ricinoleic acid esters and phospholipids are added is prepared. Somewhere in the process in which chocolate dough in a melted liquid state is prepared, the chocolate dough is caused to pass through a state in which the mass ratio between the content of the polyglycerin-condensed ricinoleic acid esters and the content of phospholipids is 100:0 to 70:30, and the viscosity of the obtained chocolate dough in a melted liquid state is reduced compared to chocolate dough in a melted liquid state prepared without being brought into such a state. In addition, when a small amount of water is added to the chocolate dough in a melted liquid state, the increase in dough viscosity is minimized. The reason why such an effect is obtained is not clear. However, it is thought important that the surface of solid particles contained in the chocolate dough is preferentially coated with the polyglycerin-condensed ricinoleic acid esters.

Regarding a specific example in which the chocolate dough is caused to pass through at least a state in which the mass ratio between the content of the polyglycerin-condensed ricinoleic acid esters and the content of phospholipids contained in the chocolate dough is 100:0 to 70:30 somewhere in the above procedure in which chocolate dough in a melted liquid state in which all of the polyglycerin-condensed ricinoleic acid esters and phospholipids are added is prepared, the following cases are assumed. For example, a conching treatment may start when only 0.2 mass % of polyglycerin-condensed ricinoleic acid esters are added to the raw material mixture after atomizing (content of polyglycerin-condensed ricinoleic acid esters:content of phospholipids=100:0), 0.2 mass % of crude lecithin (a phospholipid content of 65 mass %) may be added when the conching treatment ends, and chocolate dough in a melted liquid state (content of polyglycerin-condensed ricinoleic acid esters:content of phospholipids=60.6:39.4) may be obtained. In addition, for example, after a raw material mixture containing 0.1 mass % of crude lecithin (phospholipid content of 65 mass %) is atomized, 0.2 mass % of polyglycerin-condensed ricinoleic acid esters may be added (content of polyglycerin-condensed ricinoleic acid esters:content of phospholipids=75.5:24.5), a conching treatment starts, 0.1 mass % of crude lecithin (phospholipid content of 65 mass %) may be added when the conching treatment ends, and chocolate dough in a melted liquid state (content of polyglycerin-condensed ricinoleic acid esters:content of phospholipids=60.6:39.4) may be obtained.

In preparation (production) of the chocolate dough in a melted liquid state of the present invention, the polyglycerin-condensed ricinoleic acid esters are preferably added to chocolate dough before the first half of the conching process. Processes before the first half of the conching process include all processes performed at the midpoint of the conching process or steps therebefore. That is, generally, the first half of a raw material mixing process, an atomizing process, and a conching process may be included. For example, in the case of dry conching, the midpoint of the conching process is a time point at which an oil is added or a mass is added, and the dough is in a melted liquid state, and at this time point, polyglycerin-condensed ricinoleic acid esters may be added. In addition, in the case of wet conching, the midpoint of the total time spent in the conching process is a guide. When the polyglycerin-condensed ricinoleic acid esters are added to the chocolate dough before the first half of the conching process (in other words, before the second half), the viscosity of the chocolate dough in a melted liquid state can be effectively reduced. In addition, when a small amount of water is added to chocolate dough in a melted liquid state, it is possible to effectively minimize the increase in dough viscosity. When the chocolate dough in a melted liquid state of the present invention is prepared in a melted liquid state in the conching process, it is prepared at preferably 40 to 60° C., and more preferably 40 to 50° C. so that the flavor of chocolate is not impaired.

The chocolate dough in a melted liquid state obtained by the production method of the present invention can maintain a low viscosity even if it is temporarily cooled and solidified and heated and melted again. The chocolate dough in a melted liquid state that has been cooled and solidified temporarily and heated and melted again can also effectively minimize an increase in dough viscosity due to addition of a small amount of water. In addition, the chocolate dough in a melted liquid state obtained by the production method of the present invention can maintain a low viscosity even if it is maintained in the melted liquid state for about 1 week. The chocolate dough maintained in the melted liquid state for about 1 week can also effectively minimize an increase in dough viscosity due to addition of a small amount of water.

The particle size (D90) of solid particles contained in the chocolate dough in a melted liquid state of the present invention is preferably 10 to 30 μm, and more preferably 10 to 25 μm. Here, the solid particles can be, for example, solid particles of saccharides, a cacao component or a milk component. In addition, here, the particle size (D90) is a value measured by wet measurement (D90: a measured value of particle sizes at a cumulative value of 90% in the particle size distribution) based on a laser diffraction scattering method (ISO 133201, ISO 9276-1) using a particle size distribution measurement device (for example, device name: SALD-2300 commercially available from Shimadzu Corporation and device name: Microtrac MT3300ExII commercially available from Nikkiso Co., Ltd.). When the particle size (D90) of solid particles contained in the chocolate dough in a melted liquid state is small, the viscosity increases, and when the particle size (D90) is large, the viscosity decreases. Therefore, in order to reduce the viscosity of chocolate dough in a melted liquid state, a larger particle size (D90) is preferable. However, if the particle size is larger, since it is difficult to form a sugar framework, a smaller particle size (D90) is preferable in order to increase heat resistance of chocolate. In the method for producing chocolate dough in a melted liquid state of the present invention, even if the particle size (D90) of solid particles contained in chocolate dough in a melted liquid state is 13 to 20 μm, it is possible to effectively reduce the viscosity of chocolate dough in a melted liquid state. In addition, when a small amount of water is added to chocolate dough in a melted liquid state, it is possible to effectively minimize the increase in dough viscosity.

When the chocolate of the present invention is temper type chocolate, a tempering treatment or a seeding treatment may be performed on the chocolate dough in a melted liquid state. In addition, when a water addition process to be described below is applied, a tempering treatment or a seeding treatment may be performed before or after the water addition process.

The tempering treatment is an operation of forming crystal nuclei of stable crystals in the chocolate dough in a melted liquid state. Specifically, for example, it is known as an operation of lowering the product temperature of chocolate melted at 40 to 50° C. to about 27 to 28° C. and then heating it again to about 29 to 31° C. The tempering treatment is preferably performed after the water addition process to be described below.

The seeding treatment is a treatment in which crystal nuclei of stable crystals are dispersed in chocolate dough in a melted liquid state using a seeding agent that functions as crystal nuclei of stable crystals in place of the tempering treatment. Similar to the tempering treatment, the seeding treatment is performed to solidify oils and fats contained in the chocolate as V-type stable crystals.

When the seeding treatment is performed, either of the seeding treatment or the water addition process to be described below may come first in an order thereof. In addition, addition of the seeding agent and the water addition process may be performed at the same time. That is, the seeding agent and water may be added to the chocolate dough in a melted liquid state at the same time.

The chocolate of the present invention is obtained by cooling and solidifying the chocolate dough in a melted liquid state of the present invention. The cooling and solidifying method is not particularly limited. The method may be appropriately selected depending on the chocolate product such as molded chocolate and chocolate coated on food. The chocolate dough in a melted liquid state can be cooled and solidified by, for example, cold air blowing in a cooling tunnel, or contact with a cooling plate. In addition, the cooling and solidifying conditions are not particularly limited as long as the chocolate dough in a melted liquid state solidifies. For example, the cooling temperature is preferably 0 to 20° C., and more preferably 0 to 10° C. The cooling time is preferably 5 to 90 minutes, and more preferably 10 to 60 minutes.

A preferable embodiment of chocolate production of the present invention includes a process in which a small amount of water is added to and dispersed in chocolate dough in a melted liquid state in advance in order to form a sugar framework in chocolate (water addition process). The temperature of the chocolate dough in a melted liquid state in the water addition process is preferably 30 to 60° C., more preferably 33 to 50° C., and still more preferably 35 to 45° C. When the temperature of the chocolate dough in a melted liquid state in the water addition process is within the above range, water can be added and dispersed without impairing a flavor of chocolate. The amount of water added may be appropriately set so that the content of water in the chocolate dough is preferably 0.8 to 3 mass %. As a guideline, the amount of water is preferably 0.1 to 3 parts by mass, more preferably 0.5 to 2 parts by mass, and still more preferably 0.5 to 1.5 parts by mass with respect to 100 parts by mass of the chocolate dough in a melted liquid state.

Water added in the water addition process may be only water, or a composition containing water and components other than water (hereinafter, such a composition is referred to as a "water-containing material"). Even if the amount of water added in the water addition process is the same, the rate of increase in viscosity of the chocolate dough in a melted liquid state may change depending on components added together with water. Specifically, when water alone or a water-containing material having a high water content (fruit juice, milk, etc.) is added, the viscosity of the chocolate dough in a melted liquid state sharply increases. On the other hand, when a water-containing material such as a sugar solution or a protein solution is added, the viscosity of the chocolate dough in a melted liquid state relatively slowly increases. When the viscosity sharply increases, water cannot be sufficiently dispersed in the entire chocolate dough in a melted liquid state. Therefore, water added in the water addition process is preferably a water-containing material such as a sugar solution or a protein solution.

Regarding the sugar solution, solutions such as a reduced starch syrup, a fructose-glucose liquid sugar, and a sorbitol solution containing sugars such as fructose, glucose, sucrose, maltose, and oligosaccharides, and water may be exemplified. Examples of protein solutions include egg white meringue, concentrated milk, and raw cream containing proteins and water. The content of water contained in the sugar solution or protein solution with respect to the entire solution is preferably 10 to 90 mass %, and more preferably 10 to 50 mass %. When water in the form of a water-containing material is added in the water addition process, the amount of water added may be set so that the amount of water with respect to the amount of chocolate in a melted liquid state is within the above range.

The temperature of water or the water-containing material used in the water addition process is preferably about the same temperature as that of the chocolate dough in a melted liquid state to which water or the water-containing material is added. Therefore, the temperature of the chocolate dough in a melted liquid state is kept constant, and water or the water-containing material is easily uniformly dispersed. After water is added to the chocolate dough in a melted liquid state, water may be uniformly dispersed in the chocolate with stirring or the like.

In the water addition process, the temperature of the chocolate dough in a melted liquid state to which water is added is preferably 32 to 40° C., more preferably 33 to 38° C., and still more preferably 34 to 37° C. The chocolate dough in a melted liquid state after water is added may be held for 10 minutes or longer, at preferably 32 to 40° C., more preferably 33 to 38° C., and still more preferably 34 to 37° C. (holding process). According to this holding process, dispersion of water in the chocolate dough in a melted liquid state is promoted, and the viscosity of the chocolate dough in a melted liquid state increases.

In the holding process, the time for holding at 32 to 40° C. is preferably 0.25 to 12 hours, more preferably 0.5 to 8 hours, and still more preferably 1 to 5 hours. When the holding time is within the above range, since the viscosity of the chocolate dough in a melted liquid state relatively slowly increases, the chocolate dough can be easily handled. Here, the viscosity of the chocolate dough in a melted liquid state of the present invention can be measured using a BH type viscometer which is a rotation type viscometer. For example, at a measurement temperature, a No. 6 rotor is rotated at 4 rpm, and a plastic viscosity obtained by multiplying a read numerical value after 3 rotations by a device coefficient can be measured as the viscosity of the chocolate dough.

The chocolate dough in a melted liquid state that has been subjected to the water addition process may be cooled and solidified. According to this process, solid chocolate can be efficiently produced in the melted liquid state. When the chocolate of the present invention contains a small amount of water by applying the above water addition process or using a water-containing material or a material having high hygroscopicity as a raw material, a sugar framework is likely to be formed. The content of water in the chocolate of the present invention is preferably 0.8 to 3 mass %, more preferably 0.9 to 2.5 mass %, and still more preferably 1.0 to 2.0 mass %. Here, according to a conventional method, the content of water in chocolate can be measured using an atmospheric pressure drying loss method or a Karl Fischer Moisture Titrate.

The chocolate after cooling and solidifying may be additionally subjected to a heat retention treatment. The heat retention treatment is a treatment in which the temperature of the chocolate after cooling and solidifying remains at preferably 24 to 36° C., more preferably 26 to 34° C., still more preferably 28 to 32° C., and preferably for 1 hour to 14 days, more preferably 6 hours to 10 days, still more preferably 6 hours to 8 days, and most preferably 12 hours to 4 days. According to the heat retention treatment, a sugar framework formed in chocolate can be made stronger. In addition, after cooling and solidifying, and before the heat retention treatment, chocolate after cooling and solidifying, which is a target for the heat retention treatment, may be subjected to a pre-aging treatment, at preferably 16 to 24° C., and more preferably 18 to 22° C., and preferably for 6 hours to 14 days, more preferably 6 hours to 10 days, and still more preferably 12 hours to 4 days. In addition, the chocolate after the heat retention treatment may be subjected to an aging treatment at preferably 16 to 24° C., and more preferably 18 to 22° C., and preferably for 2 days to 20 days, and more preferably 4 days to 14 days.

The chocolate of the present invention contains preferably 28 to 46 mass %, more preferably 30 to 42 mass %, and still more preferably 32 to 38 mass % of oils and fats. Here, "oils and fats" include not only oils and fats such as cocoa butter that is mixed in as raw materials but also oils and fats (cocoa butter, milk fat, etc.) contained in raw materials such as cacao mass, cocoa powder, and whole milk powder. For example, the oil and fat (cocoa butter) content of cacao mass is about 55 mass % (oil content of 0.55), the oil and fat (cocoa butter) content of cocoa powder is about 11 mass % (oil content of 0.11), and the oil and fat (milk fat) content of whole milk powder is about 25 mass % (oil content of 0.25). The content of oils and fats contained in the chocolate is a sum of values obtained by multiplying formulation amounts (mass %) of raw materials contained in the chocolate by the oil content. When the content of oils and fats of the chocolate of the present invention is within the above range, a sugar framework of chocolate is likely to be formed.

The chocolate of the present invention contains preferably 20 to 70 mass %, more preferably 30 to 65 mass %, and still more preferably 35 to 60 mass % of saccharides. Saccharides contained in the chocolate contribute to formation of a sugar framework in the chocolate. Examples of saccharides include sugar (sucrose), lactose, glucose, maltose, oligosaccharides, fructooligosaccharides, soybean oligosaccharides, galacto-oligosaccharides, milk fruit oligosaccharides, palatinose oligosaccharide, enzymatic saccharified starch syrup, reduced starch saccharified product, isomerized liquid sugar, sucrose-bound starch syrup, honey, reduced sugar polydextrose, raffinose, lactulose, reduced lactose, sorbitol, xylose, xylitol, maltitol, erythritol, mannitol, and trehalose. Saccharides may be a sugar alcohol, and one or two or more types thereof may be contained.

The chocolate of the present invention preferably contains 30 to 58 mass % of sucrose as one of saccharides. Sucrose contained in the chocolate of the present invention is one of important components forming a sugar framework. For sucrose, it is appropriate to use powdered sugar obtained by powdering granulated sugar, which is a sucrose crystal. The content of sucrose contained in the chocolate of the present invention is preferably 32 to 54 mass %, and more preferably 34 to 50 mass %. When the content of sucrose contained in the chocolate of the present invention is within the above range, a sugar framework is likely to be formed in the chocolate.

The chocolate of the present invention preferably contains 1 to 20 mass % of lactose as one of saccharides. When lactose is contained, it is possible to increase the strength of the sugar framework of chocolate. The lactose is preferably crystalline, and is mixed in preferably in the form of a crystal. Most of commercially available lactoses are crystalline. The lactose crystals may be α-lactose or β-lactose. The α-lactose may be an anhydrate or a monohydrate. The content of lactose contained in the chocolate of the present invention is more preferably 2 to 18 mass %, and still more preferably 3 to 16 mass %. Here, whether lactose is crystalline can be confirmed by powder X-ray diffraction.

The chocolate of the present invention may contain raw materials that are generally used for chocolate in addition to oils and fats and saccharides. Examples of such raw materials include cacao mass, cocoa powder, dairy products (milk solids, etc.), emulsifiers, flavorings, pigments, and the like, and also various ingredients and various food additives, for example, starches, gums, thermocoagulable proteins, and various powders such as strawberry powder and green tea powder. The chocolate of the present invention may contain an emulsifier other than lecithin containing polyglycerin-condensed ricinoleic acid esters and phospholipids. However, the content of the emulsifier other than lecithin containing polyglycerin-condensed ricinoleic acid esters and phospholipids in the chocolate of the present invention is preferably 0 to 2 mass %, more preferably 0 to 1 mass %, still more preferably 0 to 0.5 mass %, and most preferably 0 mass %.

The chocolate of the present invention preferably contains milk powder. The milk powder used in the present invention is not particularly limited as long as it is milk-derived powder. Examples thereof include whole milk powder, skim milk powder, whey powder, cream powder, and butter milk powder. One type or two or more types of milk powder can be selected and used. In particular, the chocolate preferably contains whole milk powder, skim milk powder, or whey powder, and more preferably contains whole milk powder, or skim milk powder. The milk powder used in the chocolate of the present invention is preferably produced by spray drying with a spray dryer or the like, like the milk powder exemplified above. The content of milk powder in the chocolate of the present invention is preferably 4 to 32 mass %, more preferably 8 to 28 mass %, and still more preferably 12 to 24 mass %. When the content of milk powder contained in the chocolate of the present invention is within the above range, the chocolate has a favorable flavor and shape retention.

Whether a sugar framework is formed in the chocolate of the present invention can be confirmed by a test in which chocolate is immersed in n-hexane. That is, when chocolate immersed in n-hexane at 20° C. maintains its shape at least for 20 minutes after immersion, it can be determined that a sugar framework is formed in the chocolate. When the sugar framework is formed in the chocolate, the shape of the chocolate is also maintained due to the sugar framework, and thus heat resistance of the chocolate is improved. The chocolate in which a sugar framework is formed maintains its shape for preferably 2 hours or longer, more preferably 12 hours or longer, and still more preferably 24 hours or longer after the test in which chocolate is immersed in n-hexane.

The chocolate of the present invention can be eaten directly as, for example, die-cut chocolate. In addition, the chocolate of the present invention can be used as coating materials, filling materials, or chip materials to be mixed into dough for confectionery and bakery products (for example, bread, cake, pastry, baked confectionery, donuts, and choux confectionery). In addition, the chocolate of the present invention may be baked in an oven or the like. When the chocolate dough or chocolate in a melted liquid state of the present invention is used, various chocolate complex foods (foods containing chocolate as a part of raw materials) are obtained.

Examples

Next, the present invention will be described with reference to examples. However, the present invention is not limited to these examples.

[Analysis Methods]

(1) Particle Size (D90) of Solid Particles Contained in Chocolate Dough in a Melted Liquid State A value (D90: a measured value of particle sizes at a cumulative value of 90% in the particle size distribution) measured by wet measurement based on a laser diffraction scattering method (ISO 133201, ISO 9276-1) using a particle size distribution measurement device (for example, device name: SALD-2300, commercially available from Shimadzu Corporation) was obtained.

(2) Viscosity of Chocolate Dough in Melted Liquid State

The viscosity (unit: mPa·s) of chocolate dough in a melted liquid state was measured using a BH type viscometer (commercially available from Toki Sangyo Co., Ltd.). That is, the rotational speed of a No. 6 rotor was set to 4 rpm. Then, in chocolate of which a temperature was adjusted to a measurement temperature, the rotor was rotated three times, and a numerical value was read. The read numerical value was multiplied by a device coefficient (2500) to obtain the viscosity.

(3) Water in Chocolate

According to a conventional method, water (water content) in chocolate was measured using an atmospheric pressure drying loss method (4) n-Hexane Immersion Test (Heat-Resistant Shape Retention)

Chocolate was placed on a rhombus stainless steel net with intersections at 600 and 120° at long intervals of 16 mm and short intervals of 8 mm, and immersed in n-hexane at 20° C., and it was observed whether chocolate extraction residue remained on the net over time, the shape was observed for 48 hours, and evaluation was performed based on the following criteria. When the shape of the chocolate was maintained, it indicated that a network with sugar was more strongly formed.

⊚ The original shape was completely maintained
◯ Partial collapse, but the original shape was maintained
Δ The residue remained on the net, but the shape collapsed
x The residue completely fell off the net, and the shape completely collapsed (Preparation 1 of Chocolate Dough in a Melted Liquid State)

Chocolate doughs in a melted liquid state of Comparative Example 1 and Examples 1 to 3 were prepared using chocolate raw material formulations shown in Table 1 according to the order of addition shown in Table 2. All emulsifiers (polyglycerin-condensed ricinoleic acid esters and soybean crude lecithin) were added and dispersed, and a step in which the temperature of the dough was adjusted to 34° C. was started (0 minutes), and the state in which the chocolate dough was sufficiently stirred (63 rpm) was maintained. After 10 minutes, 4 parts by mass of liquid sugar (water content of 25 mass %) was added to 100 parts by mass of the chocolate dough in a melted liquid state. After 20 minutes, 0.3 parts by mass of a seeding agent containing StOSt(1,3-distearoyl-2-oleoyl glycerol) as a main component was added to 100 parts by mass of the chocolate dough in a melted liquid state. Then, stirring was continued at a stirring speed of 12 rpm for 180 minutes. The particle size (D90) of the solid content contained in the chocolate dough in a melted liquid state was measured, and the viscosities of the chocolate dough in a melted liquid state at each time of 0 minutes, 10 minutes, 20 minutes, 60 minutes, 120 minutes and 180 minutes were measured. The results are shown in Table 2

[Table 1]

TABLE 1

| Formulation of chocolate dough | mass % |
|---|---|
| Cacao mass | 21.00 |
| Cocoa butter | 19.75 |
| Whole milk powder | 12.80 |
| Skim milk powder | 2.50 |
| Powdered sugar | 43.50 |
| Soybean crude lecithin *1 | 0.20 |
| PGPR *2 | 0.20 |
| Flavoring | 0.05 |
| Total | 100.00 |
| Content of oils and fats of chocolate | 34.5 |

*1: Content of phospholipids was 65 mass % (product name: Lecithin DX, commercially available from The Nisshin OilliO Group, Ltd.)
*2: Polyglycerin-condensed ricinoleic acid ester, average degree of polymerization of 6 (product name: Sample No. 818SK, commercially available from Taiyo Kagaku Co., Ltd.)

[Table 2]

TABLE 2

Conditions in which emulsifier was added in production of chocolate dough in melted liquid state and measurement results of viscosity of dough

| | Comparative Example 1 | Example 1 | Example 2 | Example 3 |
|---|---|---|---|---|
| Addition before atomizing process | | | | |
| PGPR (mass %) | — | — | — | 0.10 |
| Soybean crude lecithin (mass %) | 0.07 | 0.10 | — | — |
| PGPR: phospholipids *1 | 0:100 | 0:100 | 0:0 | 100:0 |
| Addition in first half of conching process | | | | |
| PGPR (mass %) | 0.20 | 0.20 | 0.20 | 0.10 |
| Soybean crude lecithin (mass %) | 0.13 | — | — | — |

TABLE 2-continued

Conditions in which emulsifier was added in production of chocolate dough in melted liquid state and measurement results of viscosity of dough

|  | Comparative Example 1 | Example 1 | Example 2 | Example 3 |
|---|---|---|---|---|
| PGPR: phospholipids *1 Addition in second half of conching process | 61:39 | 75:25 | 100:0 | 100:0 |
| PGPR (mass %) | — | — | — | — |
| Soybean crude lecithin (mass %) | — | 0.10 | 0.20 | 0.20 |
| PGPR: phospholipids *1 | 61:39 | 61:39 | 61:39 | 61:39 |
| Particle size (D90) of chocolate dough in melted liquid state (μm) | 20 | 19 | 19 | 19 |
| Viscosity (mPa · s) *2 | | | | |
| 0 minutes | 12,750 | 12,500 | 12,500 | 10,500 |
| 10 minutes | 22,750 | 22,250 | 21,500 | 15,000 |
| 20 minutes | 23,500 | 20,500 | 20,500 | 15,000 |
| 60 minutes | 26,500 | 22,000 | 22,750 | 16,250 |
| 120 minutes | 35,500 | 26,500 | 26,500 | 20,000 |
| 180 minutes | 55,000 | 37,000 | 33,500 | 30,000 |

*1: Ratio of contents of PGPR and phospholipids contained in chocolate dough (mass ratio)
*2: Handling was slightly difficult when the viscosity (mPa · s) was 40,000, and handling was difficult when the viscosity (mPa · s) was 50,000

(Preparation 2 of Chocolate Dough in a Melted Liquid State)

Chocolate doughs in a melted liquid state of Comparative Example 2 and Example 4 were prepared using chocolate raw material formulations shown in Table 3 according to the order of addition shown in Table 4. All emulsifiers (polyglycerin-condensed ricinoleic acid esters and soybean crude lecithin) were added and dispersed, and a step in which the temperature of the dough was adjusted to 34° C. was started (0 minutes), and the state in which the chocolate dough was sufficiently stirred (63 rpm) was maintained. After 10 minutes, 4 parts by mass of liquid sugar (water content of 25 mass %) was added to 100 parts by mass of the chocolate dough in a melted liquid state. After 20 minutes, 0.3 parts by mass of a seeding agent containing StOSt(1,3-distearoyl-2-oleoyl glycerol) as a main component was added to 100 parts by mass of the chocolate dough in a melted liquid state. Then, stirring was continued at a stirring speed of 12 rpm for 180 minutes. The particle size (D90) of the solid content contained in the chocolate dough in a melted liquid state was measured, and the viscosities of the chocolate dough in a melted liquid state at each time of 0 minutes, 10 minutes, 20 minutes, 60 minutes, 120 minutes and 180 minutes were measured. The results are shown in Table 4.

[Table 3]

TABLE 3

| Formulation of chocolate dough | mass % |
|---|---|
| Cacao mass | 21.00 |
| Cocoa butter | 19.75 |
| Whole milk powder | 12.80 |
| Skim milk powder | 2.36 |
| Powdered sugar | 43.50 |

TABLE 3-continued

| Formulation of chocolate dough | mass % |
|---|---|
| Soybean crude lecithin *1 | 0.41 |
| PGPR *2 | 0.13 |
| Flavoring | 0.05 |
| Total | 100.00 |
| Content of oils and fats of chocolate | 34.5 |

*1: Content of phospholipids was 65 mass % (product name: Lecithin DX, commercially available from The Nisshin OilliO Group, Ltd.)
*2: Polyglycerin-condensed ricinoleic acid ester, average degree of polymerization of 6 (product name: Sample No. 818SK, commercially available from Taiyo Kagaku Co., Ltd.)

[Table 4]

TABLE 4

Conditions in which emulsifier was added in production of chocolate dough in melted liquid state and measurement results of viscosity of dough

|  | Comparative Example 2 | Example 4 |
|---|---|---|
| Addition before atomizing process | | |
| PGPR (mass %) | — | 0.10 |
| Soybean crude lecithin (mass %) | 0.10 | — |
| PGPR: phospholipids *1 | 0:100 | 100:0 |
| Addition in first half of conching process | | |
| PGPR (mass %) | — | — |
| Soybean crude lecithin (mass %) | — | — |
| PGPR: phospholipids *1 | 0:100 | 100:0 |
| Addition in second half of conching process | | |
| PGPR (mass %) | 0.13 | 0.03 |
| Soybean crude lecithin (mass %) | 0.31 | 0.41 |
| PGPR: phospholipids *1 | 31:69 | 31:69 |
| Particle size (D90) of chocolate dough in melted liquid state (μm) | 20 | 20 |
| Viscosity (mPa · s) *2 | | |
| 0 minutes | 28,250 | 18,500 |
| 10 minutes | 47,750 | 33,250 |
| 20 minutes | 53,750 | 33,500 |
| 60 minutes | 60,000 | 34,250 |
| 120 minutes | Unmeasurable | 39,000 |
| 180 minutes | Unmeasurable | 50,000 |

*1: Ratio between contents of PGPR and phospholipids contained in chocolate dough (mass ratio)
*2: Handling was slightly difficult when the viscosity (mPa · s) was 40,000, and handling was difficult when the viscosity (mPa · s) was 50,000

(Preparation 3 of Chocolate Dough in a Melted Liquid State)

Chocolate doughs in a melted liquid state of Reference Examples 1 to 5 were prepared using chocolate raw material formulations shown in Table 5 according to the order of addition shown in Table 6. All emulsifiers (polyglycerin-condensed ricinoleic acid esters and soybean crude lecithin) were added and dispersed, and a step in which the temperature of the dough was adjusted to 37° C. was started (0 minutes), and the state in which the chocolate dough was sufficiently stirred (63 rpm) was maintained. After 10 minutes, 4 parts by mass of liquid sugar (water content of 25 mass %) was added to and dispersed in 100 parts by mass of the chocolate dough in a melted liquid state. The viscosities of the chocolate dough in a melted liquid state at each time of 0 minutes and 10 minutes were measured. The results are shown in Table 6.

[Table 5]

TABLE 5

| Formulation of chocolate dough | mass % |
|---|---|
| Cacao mass | 20.00 |
| Cocoa butter | 6.76 |
| Cocoa butter substitute fat | 11.49 |
| Whole milk powder | 15.00 |
| Powdered sugar | 46.30 |
| Soybean crude lecithin *1 and/or PGPR *2 | 0.40 |
| Flavoring | 0.05 |
| Total | 100.00 |
| Content of oils and fats of chocolate | 33.0 |

*1: Content of phospholipids was 65 mass % (product name: Lecithin DX, commercially available from The Nisshin OilliO Group, Ltd.)
*2: Polyglycerin-condensed ricinoleic acid ester, average degree of polymerization of 6 (product name: Sample No. 818SK, commercially available from Taiyo Kagaku Co., Ltd.)

[Table 6]

TABLE 6

Conditions in which emulsifier was added in production of chocolate dough in melted liquid state and measurement results of viscosity of dough

| | Reference Example 1 | Reference Example 2 | Reference Example 3 | Reference Example 4 | Reference Example 5 |
|---|---|---|---|---|---|
| Addition in first half of conching process | | | | | |
| PGPR (mass %) | — | 0.10 | 0.20 | 0.30 | 0.40 |
| Soybean crude lecithin (mass %) | 0.40 | 0.30 | 0.20 | 0.10 | — |
| PGPR: phospholipids *1 | 0:100 | 34:66 | 61:39 | 82:18 | 100:0 |
| Viscosity (mPa·s) *2 | | | | | |
| 0 minutes | 37,500 | 19,500 | 8,750 | 7,000 | 7,500 |
| 10 minutes | 95,000 | 53,750 | 23,500 | 32,500 | 53,000 |

*1: Ratio between contents of PGPR and phospholipids contained in chocolate dough (mass ratio)
*2: Handling was slightly difficult when the viscosity (mPa·s) was 40,000, and handling was difficult when the viscosity (mPa·s) was 50,000

(Preparation 4 of Chocolate Dough in a Melted Liquid State)

Chocolate doughs in a melted liquid state of Comparative Examples 3 and 4 and Example 5 were prepared using chocolate raw material formulations shown in Table 7 according to the order of addition shown in Table 8. Here, atomizing with a roll was performed at a pressure of 10 bar in Comparative Example 3, and at a pressure of 15 bar in Comparative Example 4 and Example 5. All emulsifiers (polyglycerin-condensed ricinoleic acid esters and soybean crude lecithin) were added and dispersed, a step in which the temperature of the dough was adjusted to 34° C. was started (0 minutes), and the water content of the chocolate dough in a melted liquid state and the particle size (D90) of the solid content were measured. Then, the state in which the chocolate dough was sufficiently stirred (63 rpm) was maintained. After 10 minutes, 4 parts by mass of liquid sugar (water content of 25 mass %) was added to 100 parts by mass of the chocolate dough in a melted liquid state. After 20 minutes, 0.3 parts by mass of a seeding agent containing StOSt(1,3-distearoyl-2-oleoyl glycerol) as a main component was added to 100 parts by mass of the chocolate dough in a melted liquid state. The viscosities of the chocolate dough in a melted liquid state at each time of 0 minutes, 10 minutes, and 20 minutes were measured. Then, the chocolate dough was injected into a mold and cooled and solidified at 10° C. After cooling and solidifying, the chocolate was subjected to a heat retention treatment at 30° C. for 4 days. In addition, the water content of the chocolate after the heat retention treatment was measured and the chocolate was subjected to an n-hexane immersion test. The results are shown in Table 8.

[Table 7]

TABLE. 7

| Formulation of chocolate dough | mass % |
|---|---|
| Cacao mass | 20.00 |
| Cocoa butter | 18.80 |
| Whole milk powder | 12.80 |
| Powdered sugar | 47.95 |
| Soybean crude lecithin *1 | 0.20 |
| PGPR *2 | 0.20 |
| Flavoring | 0.05 |
| Total | 100.00 |
| Content of oils and fats of chocolate | 33.0 |

*1: Content of phospholipids was 65 mass % (product name: Lecithin DX, commercially available from The Nisshin OilliO Group, Ltd.)
*2: Polyglycerin-condensed ricinoleic acid ester, average degree of polymerization of 6 (product name: Sample No. 818SK, commercially available from Taiyo Kagaku Co., Ltd.)

[Table 8]

TABLE 8

Conditions in which emulsifier was added in production of chocolate dough in melted liquid state and measurement results of viscosity of dough

| | Comparative Example 3 | Comparative Example 4 | Example 5 |
|---|---|---|---|
| Addition before atomizing process | | | |
| PGPR (mass %) | — | — | 0.10 |
| Soybean crude lecithin (mass %) | 0.10 | 0.10 | — |
| PGPR: phospholipids *1 | 0:100 | 0:100 | 100:0 |
| Addition in first half of conching process | | | |
| PGPR (mass %) | — | — | 0.10 |
| Soybean crude lecithin (mass %) | — | — | — |
| PGPR: phospholipids *1 | 0:100 | 0:100 | 100:0 |
| Addition in second half of conching process | | | |
| PGPR (mass %) | 0.20 | 0.20 | — |
| Soybean crude lecithin (mass %) | 0.10 | 0.10 | 0.20 |
| PGPR: phospholipids *1 | 61:39 | 61:39 | 61:39 |
| Particle size (D90) of chocolate dough in melted liquid state (μm) | 36 | 19 | 19 |

TABLE 8-continued

Conditions in which emulsifier was added in production of chocolate dough in melted liquid state and measurement results of viscosity of dough

|  | Comparative Example 3 | Comparative Example 4 | Example 5 |
|---|---|---|---|
| Water content of chocolate dough in melted liquid state (mass %) | 0.7 | 0.7 | 0.7 |
| Viscosity (mPa · s) *2 |  |  |  |
| 0 minutes | 9,750 | 13,750 | 9,750 |
| 10 minutes | 32,000 | 37,000 | 21,500 |
| 20 minutes | 33,250 | 37,250 | 22,000 |
| Water content of chocolate (mass %) | 1.8 | 1.8 | 1.8 |
| Hexane immersion test |  |  |  |
| 60 minutes | Δ | ◎ | ◎ |
| 48 hours | x | ◎ | ◎ |

*1: Ratio between contents of PGPR and phospholipids contained in chocolate dough (mass ratio)
*2: Handling was slightly difficult when the viscosity (mPa · s) was 40,000, and handling was difficult when the viscosity (mPa · s) was 50,000

(Preparation 5 of Chocolate Dough in a Melted Liquid State)

Chocolate doughs in a melted liquid state of Comparative Example 5 and Example 6 were prepared using chocolate raw material formulations shown in Table 9 according to the order of addition shown in Table 10. All emulsifiers (polyglycerin-condensed ricinoleic acid esters and soybean crude lecithin) were added and dispersed, a step in which the temperature of the dough was adjusted to 34° C. was started (0 minutes), and the water content of the chocolate dough in a melted liquid state and the particle size (D90) of the solid content were measured. Then, the state in which the chocolate dough was sufficiently stirred (63 rpm) was maintained. After 20 minutes, 4 parts by mass of liquid sugar (water content of 25 mass %) was added to 100 parts by mass of the chocolate dough in a melted liquid state. Then, stirring was continued at a stirring speed of 12 rpm for 180 minutes. The viscosities of the chocolate dough in a melted liquid state at each time of 0 minutes, 20 minutes, 40 minutes, 60 minutes, 90 minutes, 120 minutes, 150 minutes and 180 minutes were measured. Then, the chocolate dough was injected into a mold and cooled and solidified at 10° C. After cooling and solidifying, the chocolate was subjected to a heat retention treatment at 30° C. for 4 days. In addition, the water content of the chocolate after the heat retention treatment was measured and the chocolate was subjected to an n-hexane immersion test. The results are shown in Table 10.

[Table 9]

TABLE. 9

| Formulation of chocolate dough | mass % |
|---|---|
| Palm kernel stearin extremely hydrogenated oil | 28.70 |
| Cacao mass | 2.09 |
| Cocoa butter | 10.11 |
| Whole milk powder | 8.40 |
| Skim milk powder | 5.00 |
| Powdered sugar | 45.15 |
| Soybean crude lecithin *1 | 0.25 |
| PGPR *2 | 0.25 |
| Flavoring | 0.05 |
| Total | 100.00 |
| Content of oils and fats of chocolate | 34.0 |

*1: Content of phospholipids was 65 mass % (product name: Lecithin DX, commercially available from The Nisshin OilliO Group, Ltd.)
*2: Polyglycerin-condensed ricinoleic acid ester, average degree of polymerization of 6 (product name: Sample No. 818SK, commercially available from Taiyo Kagaku Co., Ltd.)

[Table 10]

TABLE 10

Conditions in which emulsifier was added in production of chocolate dough in melted liquid state and measurement results of viscosity of dough

|  | Comparative Example 5 | Example 6 |
|---|---|---|
| Addition before atomizing process |  |  |
| PGPR (mass %) | — | 0.10 |
| Soybean crude lecithin (mass %) | 0.10 | — |
| PGPR: phospholipids *1 | 0:100 | 100:0 |
| Addition in first half of conching process |  |  |
| PGPR (mass %) | — | 0.15 |
| Soybean crude lecithin (mass %) | — | — |
| PGPR: phospholipids *1 | 0:100 | 100:0 |
| Addition in second half of conching process |  |  |
| PGPR (mass %) | 0.25 | — |
| Soybean crude lecithin (mass %) | 0.15 | 0.25 |
| PGPR: phospholipids *1 | 61:39 | 61:39 |
| Particle size (D90) of chocolate dough in melted liquid state (um) | 22 | 22 |
| Water content of chocolate dough in melted liquid state (mass %) | 0.8 | 0.8 |
| Viscosity (mPa · s) *2 |  |  |
| 0 minutes | 5,500 | 5,000 |
| 20 minutes | 15,000 | 12,750 |
| 40 minutes | 27,500 | 20,000 |
| 60 minutes | 33,000 | 25,750 |
| 90 minutes | 35,000 | 30,000 |
| 120 minutes | 38,000 | 32,250 |
| 150 minutes | 45,500 | 34,000 |
| 180 minutes | 66,250 | 37,250 |
| Water content of chocolate (mass %) | 1.8 | 1.8 |
| Hexane immersion test |  |  |
| 60 minutes | ◎ | ◎ |
| 45 hours | ◎ | ◎ |

*1: Ratio between contents of PGPR and phospholipids contained in chocolate dough (mass ratio)
*2: Handling was slightly difficult when the viscosity (mPa · s) was 40,000, and handling was difficult when the viscosity (mPa · s) was 50,000

(Evaluation of Viscosity Stability of Chocolate Dough in a Melted Liquid State)

Using the chocolate dough in a melted liquid state in which all emulsifiers (polyglycerin-condensed ricinoleic acid esters and soybean crude lecithin) were added and dispersed after the conching process was completed obtained in Example 3, the chocolate dough in a melted liquid state maintained at 50° C. for 5 days (Example 7), and the chocolate dough in a melted liquid state obtained from chocolate dough which was cooled and solidified and maintained at 20° C. for 5 days and heated and melted again (Example 8) were prepared, and the temperature of the dough was adjusted to 34° C. A step in which the temperature of the dough was adjusted to 34° C. was started (0 minutes) and the state in which the chocolate dough was sufficiently stirred (63 rpm) was maintained. After 10 minutes, 4 parts by mass of liquid sugar (water content of 25 mass %) was added to 100 parts by mass of the chocolate dough in a melted liquid state. After 20 minutes, 0.3 parts by mass of a seeding agent containing StOSt(1,3-distearoyl-2-oleoyl glycerol) as a main component was added to 100 parts by mass of the chocolate dough in a melted liquid state. Then, stirring was continued at a stirring speed of 12 rpm for 180 minutes. The viscosities of the chocolate dough in a melted liquid state at each time of 0 minutes, 10 minutes, 20 minutes, 40 minutes, 60 minutes, 90 minutes, 120 minutes, 150 minutes and 180 minutes were measured. Then, the chocolate dough was injected into a mold and cooled and solidified at 10° C. After cooling and solidifying, the chocolate was subjected to a heat retention treatment at 30° C. for 4 days. The chocolate after the heat retention treatment was subjected to an n-hexane immersion test. The results are shown in Table 11.

[Table 11]

TABLE 11

Conditions in which chocolate dough in melted liquid state was stored and measurement results of viscosity of dough

|  | Example 7 | Example 8 |
| --- | --- | --- |
| Viscosity (mPa · s) *1 | | |
| 0 minutes | 8,000 | 8,000 |
| 10 minutes | 11,000 | 11,000 |
| 20 minutes | 11,500 | 11,250 |
| 40 minutes | 11,250 | 11,500 |
| 60 minutes | 11,500 | 11,750 |
| 90 minutes | 12,500 | 13,750 |
| 120 minutes | 14,750 | 15,250 |
| 150 minutes | 18,000 | 18,750 |
| 180 minutes | 25,500 | 25,000 |
| Hexane immersion test | | |
| 60 minutes | ◎ | ◎ |
| 48 hours | ◎ | ◎ |

*1: Handling was slightly difficult when the viscosity (mPa · s) was 40,000, and handling was difficult when the viscosity (mPa · s) was 50,000

What is claimed is:

1. A method for producing chocolate dough in a melted liquid state, comprising
passing through at least a state in which a mass ratio between the content of polyglycerin-condensed ricinoleic acid esters and the content of phospholipids contained in chocolate dough is 100:0 to 70:30.

2. The method for producing chocolate dough in a melted liquid state according to claim 1,
wherein the mass ratio between the content of polyglycerin-condensed ricinoleic acid esters and the content of phospholipids contained in the chocolate dough in a melted liquid state is 70:30 to 25:75.

3. The method for producing chocolate dough in a melted liquid state according to claim 2,
wherein the polyglycerin-condensed ricinoleic acid esters are added to the chocolate dough before a first half of a conching process.

4. The method for producing chocolate dough in a melted liquid state according to claim 2,
wherein the particle size (D90) is 10 to 30 μm.

5. A method for producing chocolate, comprising
cooling and solidifying a chocolate dough in a melted liquid state produced by the method for producing chocolate dough in a melted liquid state according to claim 2.

6. The method for producing chocolate according to claim 5,
wherein, before the cooling and solidifying, 0.1 to 3 parts by mass of water is added and dispersed in 100 parts by mass of the chocolate dough in a melted liquid state.

7. The method for producing chocolate dough in a melted liquid state according to claim 1,
wherein the polyglycerin-condensed ricinoleic acid esters are added to the chocolate dough before a first half of a conching process.

8. The method for producing chocolate dough in a melted liquid state according to claim 7,
wherein the particle size (D90) is 10 to 30 μm.

9. A method for producing chocolate, comprising
cooling and solidifying a chocolate dough in a melted liquid state produced by the method for producing chocolate dough in a melted liquid state according to claim 7.

10. The method for producing chocolate according to claim 9,
wherein, before the cooling and solidifying, 0.1 to 3 parts by mass of water is added and dispersed in 100 parts by mass of the chocolate dough in a melted liquid state.

11. The method for producing chocolate dough in a melted liquid state according to claim 1,
wherein the particle size (D90) is 10 to 30 μm.

12. The method for producing chocolate dough in a melted liquid state according to claim 11,
wherein the particle size (D90) is 10 to 30 μm.

13. A method for producing chocolate, comprising
cooling and solidifying a chocolate dough in a melted liquid state produced by the method for producing chocolate dough in a melted liquid state according to claim 11.

14. The method for producing chocolate according to claim 13,
wherein, before the cooling and solidifying, 0.1 to 3 parts by mass of water is added and dispersed in 100 parts by mass of the chocolate dough in a melted liquid state.

15. A method for producing chocolate, comprising
cooling and solidifying a chocolate dough in a melted liquid state produced by the method for producing chocolate dough in a melted liquid state according to claim 1.

16. The method for producing chocolate according to claim 15,
wherein, before the cooling and solidifying, 0.1 to 3 parts by mass of water is added and dispersed in 100 parts by mass of the chocolate dough in a melted liquid state.

17. A method of reducing the viscosity of chocolate dough in a melted liquid state, comprising
passing through at least a state in which a mass ratio between the content of polyglycerin-condensed ricinoleic acid esters and the content of phospholipids contained in chocolate dough is 100:0 to 70:30.

18. A method of minimizing an increase in viscosity of chocolate dough in a melted liquid state, comprising
passing through at least a state in which a mass ratio between a content of polyglycerin-condensed ricinoleic acid esters and a content of phospholipids contained in chocolate dough is 100:0 to 70:30, and adding and dispersing water.

19. A chocolate dough in a melted liquid state which passes through at least a state in which a mass ratio between a content of polyglycerin-condensed ricinoleic acid esters and a content of phospholipids contained in chocolate dough is 100:0 to 70:30, and in which a mass ratio between the content of polyglycerin-condensed ricinoleic acid esters and the content of phospholipids is 70:30 to 25:75.

* * * * *